(No Model.)
G. A. ANDERSON.
COMPENSATING GEAR.
No. 536,059. Patented Mar. 19, 1895.
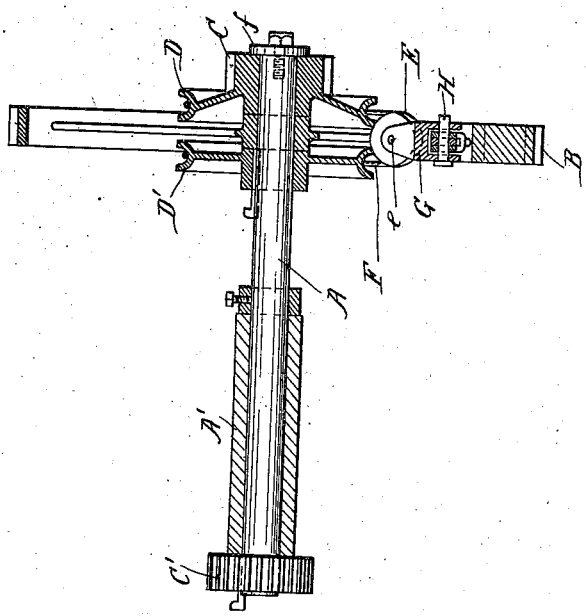
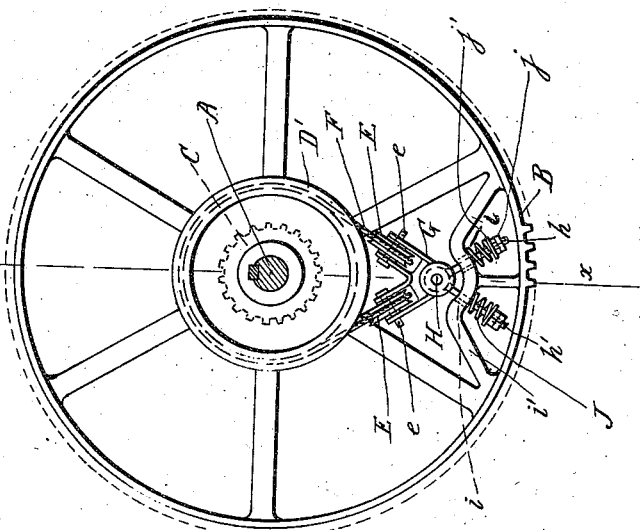
WITNESSES:
W. F. Hellen
J. Spragg Poole
INVENTOR
Gustaf A. Anderson
BY
Herbert W. T. Jenner.
ATTORNEY.

UNITED STATES PATENT OFFICE.

GUSTAF ARVID ANDERSON, OF WAYNESBOROUGH, PENNSYLVANIA, ASSIGNOR TO THE GEISER MANUFACTURING COMPANY, OF SAME PLACE.

COMPENSATING GEAR.

SPECIFICATION forming part of Letters Patent No. 536,059, dated March 19, 1895.

Application filed December 3, 1894. Serial No. 530,702. (No model.)

*To all whom it may concern:*

Be it known that I, GUSTAF ARVID ANDERSON, a subject of the King of Sweden and Norway, residing at Waynesborough, in the county of Franklin and State of Pennsylvania, have invented certain new and useful Improvements in Compensating Gears; and I do hereby declare the following to be a full, clear, and exact description of the invention, such as will enable others skilled in the art to which it appertains to make and use the same.

This invention relates to compensating gears; and it consists in the novel construction and combination of the parts hereinafter fully described and claimed, whereby the device is reduced to a very simple form and is very inexpensive to construct.

In the drawings: Figure 1 is an end view of the compensating gear. Fig. 2 is a longitudinal section taken on the line $xx$ in Fig. 1.

A is the shaft which supports the compensating gear. This shaft is journaled in bearings A' of any approved construction.

B is the driving wheel or its equivalent, such as a disk or pulley, journaled upon the shaft A.

C and C' are the power transmitting wheels or their equivalents, such as chain wheels, rope sheaves or belt pulleys. The wheel C is journaled upon the shaft A, and the wheel C' is secured to the said shaft.

D and D' are two coupling wheels. The wheel D is journaled on the shaft A on one side of the driving wheel B, and is formed integral with or is otherwise firmly secured to the wheel C. The wheel D' is secured to the shaft A on the other side of the driving wheel B from the wheel D.

E E are two guide wheels arranged at an angle to each other, journaled on the pins $e$, and carried by the driving wheel B, the axes of the pins $e$ being arranged crosswise of the axis of the shaft A.

The power transmitting wheels are preferably of equal size, and also the coupling wheels, but this is not essential if the wheels are otherwise correctly proportioned to effect the same results.

F is an endless flexible connection, such as a cord or chain. The middle loops of this flexible driving connection pass over the respective guide wheels E, and the end loops pass over the respective wheels D and D' as shown in the drawings. When the flexible connection is a drive chain, the wheels D, D' and E are formed to engage the chain so that they cannot slip.

A plate $f$ is secured to the end of the shaft A to prevent the wheels C and D from slipping off it.

When the power transmitting wheels C and C' are of the same size, the wheels D and D' are also equal to one another in size, and when the driving wheel B is revolved in either direction it revolves the wheels C and C' with equal velocity, through the wheels D and D' and the flexible connection, as long as the wheels C and C' are working against equal resistances. When, however, the resistance to one power transmitting wheel becomes greater than the resistance to the other power transmitting wheel, the coupling wheels D and D' are revolved in opposite directions, and the velocity of the power transmitting wheels becomes unequal and inversely proportional to their respective resistances.

The guide wheel pins $e$ may engage with the driving wheel B, but in order to take up all the slack of the flexible connection, and not require that it should be of a certain exact length, the pins $e$ are preferably carried by a bracket G. Two rods $h\ h'$ are pivoted to the bracket G by the pin H, and are preferably arranged substantially in line with the guide sheaves to which they pertain. The rods $h\ h'$ pass loosely through holes $i$ in the brackets $i'$ formed integral with the wheel B, and have nuts $j$ and washers $j'$ on their ends.

J are springs interposed between the washers $j'$ and the brackets $i'$, so that the guide wheels E are supported by the said springs and the flexible connection F is held in tension.

This compensating gear is applicable for many purposes where power has to be divided up, but it is more particularly adapted for use in connection with traction engines.

When applied to a simple form of traction engine, B is a single main toothed driving wheel. The shaft A is the axle of the road wheels, and the power transmitting wheels are the hubs of the two said road wheels.

When the traction engine is moving along a straight road the resistances to its road wheels are equal, and the coupling wheels D and D' and the driving wheel B all revolve isochronously; but when the traction engine turns a corner, one road wheel has to move faster than the other and the resistances become unequal. The coupling wheels D and D' are then revolved irregularly and not isochronously with the wheel B, and the speed transmitted by them to the road wheels are inversely proportional to the resistances to be overcome.

What I claim is—

1. In a compensating gear, the combination, with the driving wheel B, and the coupling wheels arranged concentric therewith and one on each side thereof; of the two spring-supported guide sheaves arranged at an angle to each other and carried by the wheel B, and a flexible endless driving connection passing around the said guide wheels and coupling wheels, substantially as and for the purpose set forth.

2. In a compensating gear, the combination, with the driving wheel B provided with brackets $i'$, and the coupling wheels arranged concentric with the wheel B and one on each side of it; of the bracket G, the rods $h\,h'$ pivoted to the bracket G and passing through holes in the brackets $i'$, the adjustable supporting springs connected to the said rods, the guide sheaves journaled in the brackets G, and a flexible endless driving connection passing around the said guide wheels and coupling wheels, substantially as and for the purpose set forth.

In testimony whereof I affix my signature in presence of two witnesses.

GUSTAF ARVID ANDERSON.

Witnesses:
J. A. MIDDOWER,
WM. G. EPPLEY.